United States Patent [19]

Vogelsong

[11] Patent Number: 4,768,098
[45] Date of Patent: Aug. 30, 1988

[54] CID IMAGER WITH REDUCED CROSSTALK AND METHOD FOR OPERATION THEREOF

[75] Inventor: Thomas L. Vogelsong, Schenectady, N.Y.

[73] Assignee: General Electric Company, Schenectady, N.Y.

[21] Appl. No.: 91,468

[22] Filed: Aug. 31, 1987

[51] Int. Cl.[4] .............................................. H04N 3/14
[52] U.S. Cl. ........................... 358/213.31; 358/213.15; 358/213.18
[58] Field of Search ...................... 358/213.12, 213.31, 358/213.19, 213.15, 213.16, 213.18; 357/24 LR

[56] References Cited

U.S. PATENT DOCUMENTS

| | | | |
|---|---|---|---|
| 4,301,520 | 11/1981 | Green | 357/24 LR |
| 4,316,221 | 2/1982 | Swab | 358/213.31 |
| 4,336,557 | 6/1982 | Koch | 358/213.15 |
| 4,434,441 | 2/1984 | Ishizaki et al. | 358/213.31 |
| 4,681,440 | 7/1987 | Burke et al. | 357/24 LR |
| 4,682,236 | 7/1987 | Wang et al. | 358/213.31 |
| 4,689,688 | 8/1987 | Michon | 358/213.31 |
| 4,734,776 | 3/1988 | Wang et al. | 358/211 |

Primary Examiner—Jin F. Ng
Assistant Examiner—Stephen Brinich
Attorney, Agent, or Firm—Geoffrey H. Krauss; James C. Davis, Jr.; Marvin Snyder

[57] ABSTRACT

A charge-injection-device imager, having reduced crosstalk in a two-dimensional array of pixels each of which stores charge responsive to impingent light photons and until injection occurs, has: a column scanner for cyclically scanning each successive column of the array for each row to be scanned; a row scanner for cyclically scanning each successive row of the array, with each row being enabled after the conclusion of an injection time interval which appears after a previous row has been scanned, and also for re-scanning that row again while a second-next row is being scanned; line delay storage for the video signal provided by two successively scanned rows; and a subtractor for providing an imager output signal as the difference between the stored video signal from any row and the video signal from that same row after the stored charge of that row of pixels has been injected out of that row of pixels only after the next row had already been readout. A method for reducing crosstalk in a charge-injection-device imager of this type is also disclosed.

19 Claims, 3 Drawing Sheets

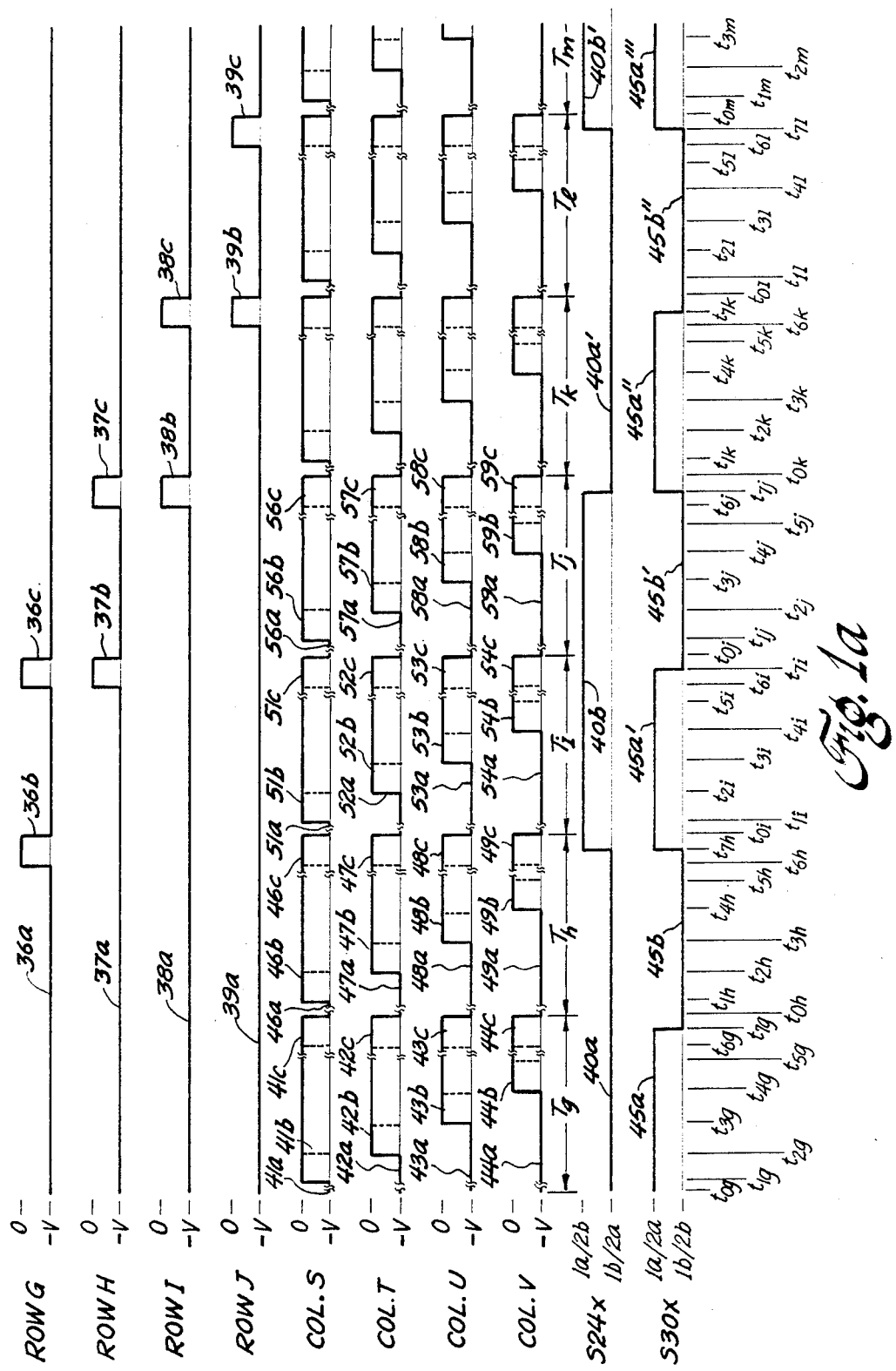

CID IMAGER WITH REDUCED CROSSTALK AND METHOD FOR OPERATION THEREOF

BACKGROUND OF THE INVENTION

The present invention relates to solid state imagers and, more particularly, to a novel charge-injection-device (CID) imager and method of operation for realizing reduced crosstalk between adjacent rows of pixels.

A CID imager is normally operated with the magnitude of the integrated charge stored in a particular picture element (pixel) being read from that pixel before the pixel is cleared by injection of the stored charge into the underlying semiconductor substrate. While most of the pixel charge is carried into the reverse-biased P-N junction of the epitaxial layer and substrate, a portion of the injected charge nevertheless manages to move into laterally adjacent pixels. As the pixel density of a CID imager increases, the probability of charge being injected from one pixel into an adjacent pixel tends to increase. If the epitaxial layer thickness is reduced to increase the probability of capture of the injected charge by the P-N junction, the imager sensitivity begins to suffer. Thus, some form of tradeoff must be made; in a black and white vision system, the resulting crosstalk leads to a reduction of the apparent resolution, thus defeating the purpose for attempting higher pixel density. In a color imager system, the effect is even more problematic as the photons passing through one color filter may end up in another channel and cause color crosstalk which distorts the color rendition of the frame. While several techniques for reducing the actual crosstalk, or the crosstalk effects, have been proposed, such techniques not only require additional imager processing or additional circuitry, but also provide only a partial crosstalk reduction. Those techniques which reduce crosstalk effect by mathematically performing crosstalk inversion suffer from the drawback that the exact amount of crosstalk of each location must be known, even if the additional circuitry required to perform the calculation is not an undue addition to the imager.

Prior to this invention, a known CID imager was read-out by having a first row of pixels read into a single line store, or row delay, means at a first time. Then all pixels along that row are cleared in parallel by injection, with some portion of the injected charge ending up in the pixels of an adjacent immediately-previous and immediately-subsequent imager pixel row. In the next time interval, the now-empty pixels along the first row and the pixels along the immediately-subsequent row are simultaneously read out, with a differential amplifier taking the difference between the delayed first row signal (from the single line store) and the now-empty first row signal; the signal subtraction removes fixed pattern noise. The second full row signal is read into the delay means; the delayed signal now consists of the actual second row signal plus a crosstalk portion attributable to injection of the first row signal. In a subsequent third time interval, the second row is cleared by injection, with the second row charge crosstalking into pixels of the first row and an adjacent third row of imaging cells. The first row may be held in the injected state during this time interval to eliminate crosstalk from the second row back to the first row. The third row and the now-empty second row are then read out, with the now-empty second row signal being subtracted from the delayed second row signal, to remove fixed pattern noise from the output signal attributable to the second pixel row. The process cyclically continues across all rows of the image. However, significant crosstalk contribution may occur.

It is therefore highly desirable to reduce injection crosstalk in a CID imager, while still maintaining high sensitivity and relative simplicity of readout circuitry.

BRIEF SUMMARY OF THE INVENTION

In accordance with the invention, a charge-injection-device imager, having reduced crosstalk in a two-dimensional array of pixels each for storing charge responsive to impingent light photons and until injection occurs, has: a column scanning means for cyclically scanning each successive column of the array for each row to be scanned; a row scanning means for cyclically scanning each successive row of the array, with each row being enabled after the conclusion of an injection time interval which appears after a previous row has been scanned, and also for scanning that row again while a second-next row is being scanned; means for storing the video signal provided by two successively scanned rows; and means for providing an imager output signal as the difference between the stored video signal from any row and the video signal from that same row after the stored signal charge of that row of pixels has been injected out of that row of pixels.

A method for reducing crosstalk in a charge-injection-device imager having a two-dimensional array of pixels each for storing charge responsive to photons impingent thereon after injection of charge therefrom, comprises the steps of: dividing the array into a plurality R of rows each of a plurality of pixels; reading as a first video signal the stored charge sequentially from each pixel of a g-th row, where $1 \leq g \leq R$; storing the first video signal as sequentially read from each pixel of the g-th row; then injecting the charge stored in all of the pixels of the g-th row only after the stored charge has been read from the pixels of the (g+1)-st row: then re-reading the stored charge sequentially from each pixel of the g-th row as a second video signal; subtracting the second video signal from the first video signal to provide for the g-th row an imager output signal substantially free of injected crosstalk; and cyclic repeating the foregoing steps for all rows of the array for each read-out of the imager array.

In a presently preferred embodiment, the g-th row pixels are injected a second time, after being re-read, to clear any crosstalk components due to injection of the (g+1)-st row pixels.

Accordingly, it is an object of the present invention to provide a novel charge-injection-device imager having reduced injection crosstalk, and to provide a novel method for operation thereof.

This and other objects of the present invention will become apparent after a reading of the following detailed description, when considered in conjunction with the associated drawings.

BRIEF DESCRIPTION OF THE DRAWINGS

FIG. 1a is a set of time-coordinated signal waveforms occurring on various row, column and switch control buses of the imager and useful in understanding operation thereof.

DETAILED DESCRIPTION OF THE INVENTION

Figure 1:
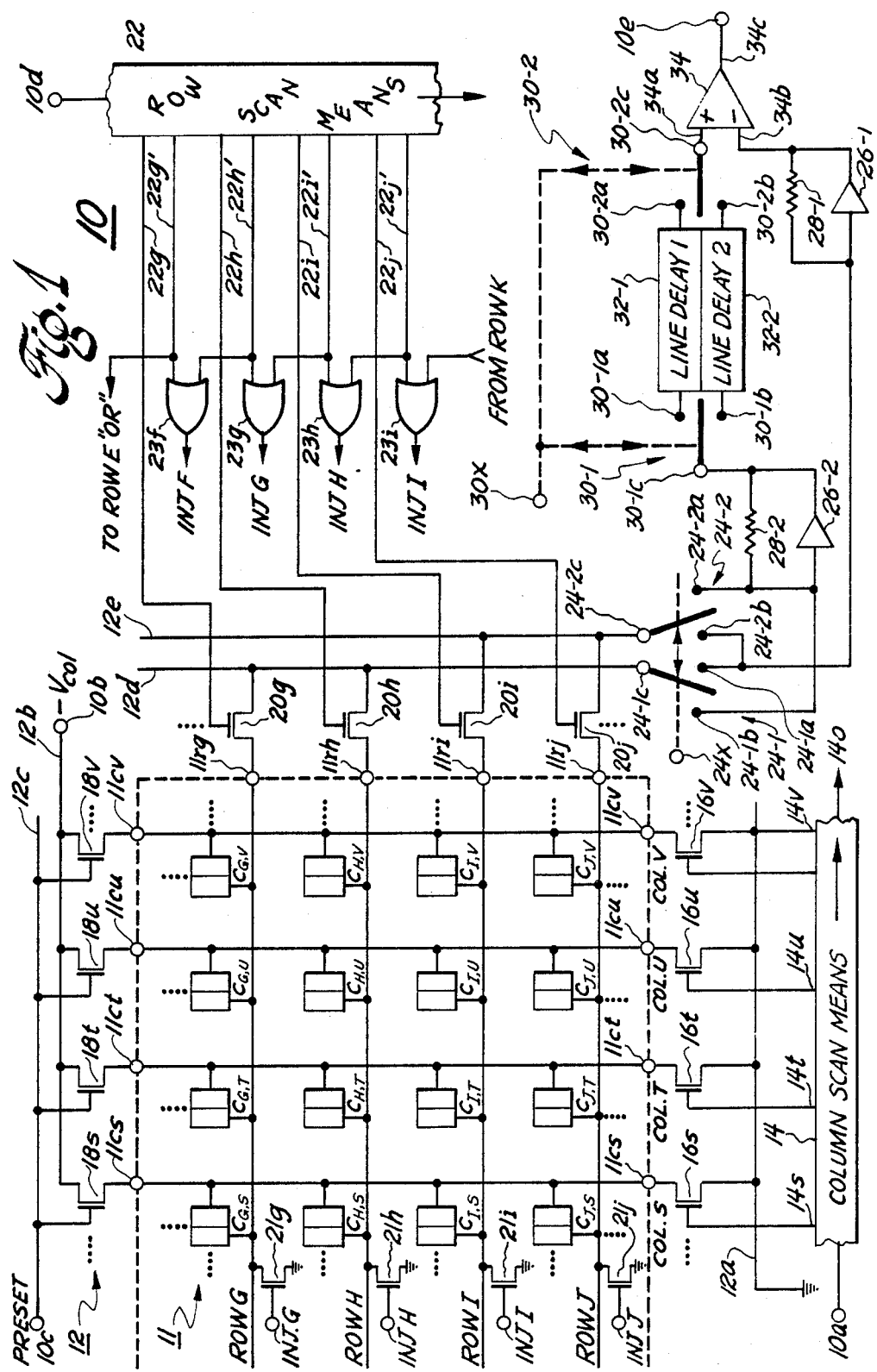
FIG. 1 is a schematic block diagram of one presently preferred embodiment of a CID imager in accordance with the principles of the present invention.

Referring initially to FIG. 1, one presently preferred embodiment of a charge-injection-device (CID) imager 10 includes a CID cell array 11 and peripheral electronics means 12 for reading out the stored charge from each cell, or pixel (picture element), of array 11. Array 11 is shown as a portion of a rectangular array having a plurality R of rows and a plurality C of columns, at the intersection of each of which is an imaging cell $C_{r,c}$, where the row r number here ranges from row G through row J, and the column c number here ranges from column S through column V. Each array row has a row scan node 11rx, where $g \leq x \leq j$, and each array column has a column scan node 11cy, where $s \leq y \leq v$. A column scanning means 14 receives a column scan commencement signal at an imager first input 10a, to progressively temporarily enable column scanning outputs 14s–14v and to finally pulse enable a last column scan means output 14o after all columns of the array have been pulsed. Each of the column scan means outputs, except final output 14o, is respectively connected to the gate electrode of a column scanning device 16y. Each column scanning device 16y has a first channel electrode connected to a first peripheral electronics common bus 12a and has the remaining end of the controlled channel of the device connected to an associated one of the column nodes 11cy of the array. Also connected to this node is one end of the controlled channel of a second plurality of devices 18y, having the remaining channel end connected to a second peripheral bus 12b, which receives a column voltage $-V_{col}$ at a second imager terminal 10b. A third peripheral bus 12c receives a preset potential from a third imager terminal 10c, for connection in parallel to all of the gate electrodes of devices 18y. Each of a plurality of controlled row select devices 20 has a first end of its controlled channel connected to an associated one of row nodes 11rx, and the remaining end of the channel coupled to one of peripheral video signal buses 12d or 12e, respectively. The rows are coupled to buses 12d and 12e in pairs, such that first and second rows, e.g. row G and row H, are connectable through their associated row select devices 20g and 20h, respectively, to first video bus 12d, while the next pair of rows, e.g. row I and row J, are connectable through their associated row select devices 20i and 20j, respectively, to the other video bus 12e. The next row pair will be connected to the first video bus 12d, and so forth. Each row node 11rx is also connectable to a common potential through an injection device 21x, responsive to a row injection signal INJx at its control electrode. The gate of each row control device 20x is connected to an associated row select output 22x of a row scanning means 22. Row scanner 22 also provides an injection enable signal, for each row x, at an associated output 22x'. The row select and row injection signals are provided, as more fully described hereinbelow, responsive to circulation through the register of means 22 of a row scanning signal received at a fourth imager input 10d. Operation of row scan means 22 can be such that each row select and row injection signal output is mutually-exclusively enabled by the trailing edge of the last column select means output 14o signal. Both means 14 and means 22 are, illustratively, shift registers. One input of a two-input OR gate 23(x−1) associated with a previous (x−1)-st row receives the row injection output 22x' for the x-th row; the other gate input is connected to the row-injection output 22(x+1)' for the next row. The OR gate output is connected to provide the INJ(x−1) signal to the control electrode of the associated device 21(x−1) whenever the injection signal is enabled after each of the two next rows (the x-th row and the x+1-st row) have been initially read during each array scan.

Each of the pair of video peripheral buses 12d or 12e is connected to the common terminal 24-1c or 24-2c, respectively, of first and second video switching means 24-1 or 24-2, respectively. A control terminal 24x accepts a binary S24 control signal which determines whether common terminals 24-1c and 24-2c are respectively coupled to a first switching means first selectable contact 24-1a and 24-2a respectively, or to a second selectable control 24-1b and 24-2b, respectively. Terminal 24-1a is connected to the input of a first video amplifier means 26-1, having a gain-setting resistance 28-1 associated therewith. First switching means second selectable terminal 24-1b is connected to the input of a second video amplifier means 26-2 having a second gain-setting resistance 28-2 associated therewith. The second switching means 24-2 has its first selectable terminal 24-2a connected, in parallel with the first switching means second terminal 24-1b, to the second video amplification means, and has a second selectable terminal 24-2b connected, in parallel with first switching means first selectable terminal 24-1a, to the first video amplification means 26-1.

The output of the second video amplification means 26-2 is connected to the common terminal 30-1c of a third video switching means 30-1, having its first selectable terminal 30-1a connected to the input of a first line, or row, delay means 32-1 for storing one full row of video signals and for delaying the appearance at its output of each video signal applied at its input, by a time interval equal to the time required for the scanning of all pixel columns along two rows (and including the two injection time intervals, one at the end of each row scan). The third video switching means has a second selectable terminal 30-1b connected to the input of a second line, or row, delay means 32-2, also configured to have a two-row delay. The output of the first delay line means is connected to a first selectable terminal 30-2a of a fourth video switching means 30-2, having its second selectable terminal 30-2b receiving the output of the second line delay means. The fourth video switching means common terminal 30-2c is connected to the non-inverting input 34a of a differential video amplifier means 34, having its inverting input 34b connected to the output of the first video amplifier means 26-1. The differential video amplifier output 34c is connected to an imager video output terminal 10e. The state of third and fourth video switching means 30-1 and 30-2 is controlled by the state of a second video switch S30x control signal at a control input 30x. It will be seen that switching means 30-1 and 30-2 can be removed, as can second delay means 32-2, if a single delay means 32 stores 2 full rows of video signals with a 2 row delay.

In accordance with one aspect of the present invention, row scan means 22 not only sequentially energizes the successive ones of outputs 22x, in a continuous repetitious wrap-around sequence, but also energizes that particular output 22x for a second time during a row select time interval which is two row time intervals after the time interval during which that row is initially selected, i.e., when the next-plus-one row (x+2) is scanned. Thus, while a row is initially selected in a time interval associated with that row, e.g. the H row being selected in the h-th time interval $T_h$, that same row is again selected in the second subsequent time interval, e.g. the $T_j$ time interval thereafter. It will be seen that the g-th row is thus selected in time intervals $T_g$ and $T_i$, while the next h-th row is selected in the $T_h$ and $T_j$ time intervals, and the i-th row is selected in time intervals $T_i$ and $T_k$, while the next j-th row is enabled in the $T_j$ and $T_l$ time intervals respectively. During each row time interval, all of the columns are sequentially scanned by successive enablement of the column scan means 14 outputs 14s–14v, and a last column interval is provided at the end of each row scan (when output 14o is enabled) for injection enablement of those two rows selected by their injection gates 23.

Referring now to FIGS. 1 and 1a, in operation, all columns of a row are scanned after each new row is selected. The rows are substantially continuously and cyclically selected, so that the first row is selected shortly after the last row. Thus, at some instant selected for purposes of illustration, at time $t_{og}$, the row scan means g-th row select output 22g is enabled (e.g. switched to a more-negative, or high, logic level) placing the row select device 20g in a conductive condition and connecting row node 11rg to first video bus 12; the ROW G voltage (first waveform of FIG. 1a) is at a $-V$ value (provided through bus row terminator means not shown, but well known in the art), in portion 36a, as device 21g is now non-conductive. The row select outputs, i.e. outputs 22h–22j for the rest of the illustrated rows 37a–38a are all at the low logic level, disabling conduction through the associated row select devices 20h–20j, and all injection signal outputs 22x' are inactive, so that all non-selected rows remain at their $-V$ potential. Responsive to a low S24x control input signal portion 40a, first video switching means 24-1 connects first video bus 12d at common contact 24-1c to its second selectable contact 24-1b, so that the row G video signal is amplified in amplification means 26-2 and transferred through third switch means 30-1 to first line delay means 32-1. Devices 18 have been previously switched to the conductive condition, so that each of the column nodes 11cs–11cv has been connected to the $-V_{col}$ common potential for allowing pixel change integration, as in portions 41a–44a. The individual column potentials will fall to the common potential, as in portions 41b–44b, as each of the associated column switching devices 16s–16v is sequentially pulsed to the conductive condition. The column scan means, having previously completed a scan of all columns for the previous row, is ready (at time $t_{og}$) to accept another scan-commencement signal pulse at input 10a, for circulation through the column scan means 14 to sequentially enable each sequential column output, e.g. column outputs 14s–14v. Responsive thereto, the signal charge contained in the associated cell, having been accumulated since the last injection of charge from that cell, is read out along the associated row bus, e.g. the g-th row bus and node 11rg. Thus, while earlier scanned columns are read out prior to time $t_{1g}$, column scan means output 14s is enabled at time $t_{1g}$ to cause device 16s to conduct in signal portion 41b, which ends at time $t_{2g}$; the charge in that cell $C_{G,S}$ at the intersection of the zero potential column(S) and the selected row (G) is readout as a signal appearing: on the row G bus, at node 11rg, through the now-enabled row select device 20g, on bus 12d and through pulse amplifier means 26-2 and switching means 24 and 30, to provide a pixel $C_{G,S}$ video signal for storage into first line delay means 32-1. At time $t_{2g}$, next device 16t is enabled to cause the signal charge in the next cell $C_{G,T}$ to be sequentially read into delay line 32-1, in signal portion 42b. Thereafter, the charge in cell $C_{G,U}$ is read into the delay line at time $t_{3g}$, in signal portion 43b, followed by the charge in cell $C_{G,V}$ at time $t_{4g}$, in signal portion 44b, and so forth. When the last column in the selected row (row G) is read, the column scan means output 14o is again energized at time $t_{6g}$ and all column outputs 14x remain enabled in signal portions 41c–44c, to pull all nodes 11cx temporarily to ground potential. The actual pair of rows, e.g. previous rows E and F, along which all cells are to be injected are selected for injection by the enablement of the next row (row G) scan means output 22g'. The switching means 30 control input signal S30x reverses at time $t_{7g}$ (at the end of portion 45a) and the injection pulse at output 22g' ends, enabling a new row scan interval $T_h$ to start at time $t_{0h}$. The foregoing description is for the illustrated circuit, where each column line remains at common potential after reading and until row injection ends; other known circuitry can replace devices 16, to allow return of each column line to a low $-V$ voltage between the associated column-read pulse end injections pulse (i.e. the edges shown in broken line occur for pulsed read out).

The g-th row (here row G), having just been read but not injected, will now still contain the integrated signal plus the fixed-pattern-noise (FPN) charge in each cell. The g-th row pixels now receive some injected charge by crosstalk from the pixels of the last, or (g−1)-st, row (here row F), responsive to row F cell injection from time $t_{6g}$ to time $t_{0h}$. Thus, while the pixels of the next, or (g+1)-st, row (H) are being readout and stored in the second line delay means 32-2, the g-th row (G) pixels are integrating injected crosstalk charges, in addition to the picture and FPN charges. At the end of the (g+1)-st row (H) scan, the associated injection output 22h' is enabled and gate 23g now causes device 21g to conduct and place the row G bus and row 11g at common potential; when all columns go to common potential, at time $t_{6h}$, the g-th row cells all inject their charges (in row G signal portion 36b) and are cleared. In the subsequent (g+2)-nd row (I) time interval $T_i$, only the FPN charge is stored in the g-th row (G) cells. The enablement condition of first video switch control input 24x is changed only for every other (i.e. alternate) row, so that the S24x control signal now changes to a high logic level at time $t_{7h}$ and, in signal portion 45a', first video bus 12d is now connected to video amplifier 26-1; the enablement condition of the S30x signal at third/fourth video switching means control input 30x also changes at time $t_{7h}$, so that third video switching means 30-1 connects the g-th row (G) signal, now appearing at the output of the first line delay means 32-1, to the differential video amplifier non-inverting input 34a. The FPN signal from each successively scanned row G cell is applied from video amplifier means 26-1 to a differential amplifier inverting input 34b, and is effectively subtracted from the delayed video signal from the same cell. That is, differential amplifier 34 takes the difference of (1) a cell signal-plus-FPN charge contribution, from the delay line, and (2) the "empty" (injected) cell FPN noise charge contribution, directly from that cell, to provide a signal, at output 10e, from which fixed-pattern-noise is removed. Note that the injected charge from the cells of the prior (g−1)-st row (F) is collected in any g-th row (G) cell prior to the cells of that row (G) all being injected, so that no adjacent prior-scanned row charge is involved in either read-out. The g-th row (G) cells are also injected a second time, when the next, i.e. (g+1)-st, row (H) cells are injected, to get rid of any injection crosstalk contribution from injection of the next array row. All other rows, not being immediately adjacent, provide little, if any, crosstalk charge, if the array epitaxial layer thickness is properly selected.

Figure 2:
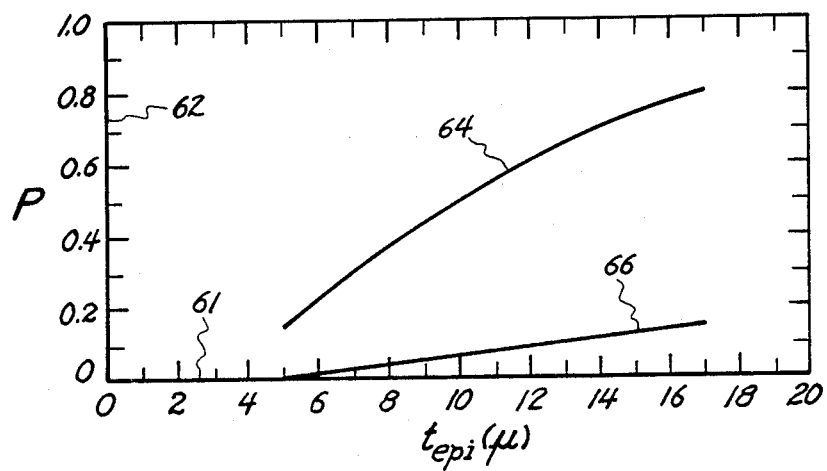
FIG. 2 is a graph illustrating the reduction of crosstalk achievable with a CID imager of the present invention.

Referring now to FIG. 2, the graph illustrates the reduction of crosstalk by use of this novel method with the novel apparatus of my invention. The abscissa 61 is scaled in microns of epitaxial layer thickness ($t_{epi}$) while the ordinate 62 is scaled in probability P of an injected charge (from a 7.5 micron-by-11 micron pixel) crosstalking into (i.e. traveling to and being acquired by) an adjacent pixel on either side (note here that the probability of injection into a pixel on a selected side of the injected row is P/2). Curve 64 is the injection-acquisition probability for a next row in a CID imager operated by the prior art method where injection occurs after a present row is read, but prior to initial reading of a next row; curve 66 shows the probability when the present row is not injected until after the next row is initially readout, as in the present invention. It will be seen, since sensitivity tends to increase with increasing epitaxial layer thickness, that a high-sensitivity CID imager can be obtained with low crosstalk, by use of my novel method and imager.

While one presently preferred embodiment of my novel method and imager has been present herein by way of explanation, many variations and modifications will now become apparent to those skilled in the art. For example, while the present embodiment describes a progressive scan imager, this method can be used with an interlaced scan imager, in which the first field might read out pairs of rows 1 and 2, 3 and 4, 5 and 6, etc., while the second field might read out pairs of rows 2 and 3, 4 and 5, 6 and 7, etc. in accordance with my novel method of crosstalk reduction. It is my intent, therefore, to be limited only by the scope of the appended claims.

What I claim is:

1. A method for reducing crosstalk in a charge-injection-device imager having a multiplicity of pixels each for storing charge responsive to photons impingent thereon after injection of charge therefrom, the pixels being arranged in a two-dimensional array having R rows each with a plurality of pixels, comprising the steps of:
   (a) for each g-th row, where $1 \leq g \leq R$, reading as a first video signal the stored charge sequentially from each pixel of that row;
   (b) storing the first video signal read from each g-th row;
   (c) then injecting the charge stored in all of the pixels of the g-th row after the stored charge has been read from the pixels of the (g+1)-st row;
   (d) then re-reading as a second video signal the stored charge sequentially from each pixel of the g-th row;
   (e) subtracting the second video signal from the first video signal to provide for the g-th row an imager output signal substantially free of injected crosstalk; and
   (f) cyclic repeating steps (a)–(e) for each of the R rows of the array for each read-out of the imager array.

2. The method of claim 1, wherein step (c) further comprises the steps of: first reading the stored charge sequentially from each pixel of the (g+1)-st row; and then injecting the charge then stored in each pixel of the g-th row.

3. The method of claim 2, wherein step (c) further comprises the step of storing the sequentially read charge from the (g+1)-st row as a third video signal completely separate from the first video signal.

4. The method of claim 3, further comprising the step of providing an equal plurality C of pixels along each of the R rows of the array.

5. The method of claim 4, wherein each storing step includes the step of delaying the associated video signal by twice a line delay time interval, each substantially equal to the sum of (1) a time interval required to read-out the charge from all C pixels of a row, and (2) an injection time interval required to clear the charge from all pixels of a row.

6. The method of claim 1, wherein step (d) further comprises the step of re-injecting the charge stored in all of the pixels of the g-th row after the stored charge has been read from the pixels of the (g+2)-st row.

7. The method of claim 6, wherein the re-injecting step includes the steps of: first reading the stored charge sequentially from each pixel of the (g+2)-st row; and then injecting the charge then stored in each pixel of the g-th row.

8. The method of claim 7, further comprising the step of storing the sequentially read charge from the (g+2)-st row as a fourth video signal sequentially following the first video signal.

9. The method of claim 8, further comprising the step of providing an equal plurality C of pixels along each of the R rows of the array.

10. The method of claim 9, wherein each storing step includes the step of delaying the associated video signal by twice a line delay time interval, each substantially equal to the sum of (1) a time interval required to read-out the charge from all C pixels of a row, and (2) an injection time interval required to clear the charge from all pixels of a row.

11. A solid-state imager having reduced crosstalk in a charge injection device with a multiplicity of pixels each for storing charge responsive to photons impingent thereon after injection of charge therefrom, the pixels being arranged in a two-dimensional array having R rows each with a plurality of pixels, said imager comprising:
   means for cyclically and consecutively reading the stored charge sequentially from each pixel of each g-th row, where $1 \leq g \leq R$, as a first video signal;
   means for storing the first video signal read from each g-th row;
   means for then injecting the charge stored in all of the pixels of the g-th row after the reading means has caused the stored charge to be read from the pixels of a (g+1)-st row into the storing means as a second video signal;
   said reading means then operating to again read, as a third video signal, the stored charge sequentially from each pixel of the g-th row; and
   means for subtracting the third video signal from the first video signal to provide for the g-th row an imager output signal substantially free of injected crosstalk.

12. The imager of claim 11, wherein the storing means stores the second video signal from the (g+1)-st row as a video signal completely separate from the first video signal.

13. The imager of claim 12, wherein the array has an equal plurality C of pixels along each of the R rows of the array.

14. The imager of claim 13, wherein said storing means delays each video signal provided thereto by twice a line delay time interval, each substantially equal to the sum of (1) a time interval required for said reading means to readout the charge from all C pixels of a row, and (2) an injection time interval required for said injecting means to clear the charge from all pixels of a row.

15. The imager of claim 11, wherein said injecting means further operates to again re-inject the charge stored in all of the pixels of the g-th row after the reading means has caused the stored charge to be read from the pixels of the (g+2)-st row.

16. The imager of claim 15, wherein the reading means first reads the stored charge sequentially from each pixel of the (g+2)-st row before the injecting means re-injects the charge then stored in each pixel of the g-th row.

17. The imager of claim 16, wherein the storing means stores the video signal from the (g+2)-st row as another video signal immediately following the first video signal from the g-th row.

18. The imager of claim 17, wherein the array has an equal plurality C of pixels along each of the R rows of the array.

19. The imager of claim 18, wherein said storing means delays each video signal provided thereto by twice a line delay time interval, each substantially equal to the sum of (1) a time interval required for said reading means to readout the charge from all C pixels of a row, and (2) an injection time interval required for said injecting means to clear the charge from all pixels of a row.

* * * * *